United States Patent [19]

Krueger

[11] Patent Number: 5,424,338
[45] Date of Patent: Jun. 13, 1995

[54] RIGID HYDROPHILIC POLYURETHANE FOAMS

[75] Inventor: David C. Krueger, Grosse Ile, Mich.

[73] Assignee: BASF Corporation, Mount Olive, N.J.

[21] Appl. No.: 925,141

[22] Filed: Aug. 6, 1992

[51] Int. Cl.$^6$ .............................................. C08G 18/00
[52] U.S. Cl. .................................... 521/174; 521/155; 521/163; 521/170; 528/40; 528/49; 528/52; 528/53; 528/54
[58] Field of Search ............... 521/174, 155, 163, 170; 528/48, 49, 52, 53, 54

[56] References Cited

U.S. PATENT DOCUMENTS

| | | |
|---|---|---|
| 3,036,118 | 5/1962 | Jackson et al. |
| 3,036,130 | 5/1962 | Jackson et al. |
| 3,112,281 | 11/1963 | Gromacki et al. |
| 3,970,618 | 7/1976 | Jabs et al. |
| 4,310,632 | 1/1982 | Horacek et al. ........................ 521/121 |
| 5,162,385 | 11/1992 | Hartwig et al. ........................ 521/118 |
| 5,167,884 | 12/1992 | Rossio et al. ........................ 521/174 |

FOREIGN PATENT DOCUMENTS 2003911 6/1990 Canada.

OTHER PUBLICATIONS

Olin Corporation; Olin Urethane Chemicals Product Data, "Terms and Formulas Used in Urethane Polymer Preparations", 1988, our pp. 1-6.

*Primary Examiner*—Paul R. Michl
*Assistant Examiner*—Duc Truong
*Attorney, Agent, or Firm*—Dennis V. Carmen

[57] ABSTRACT

The invention relates to rigid, open-celled hydrophilic polyurethane foams obtained by reacting in the presence of water as a blowing agent and a polyisocyanate with a polyhydric polyamine initiated polyether polyol. The polyether polyol is initiated with a polyhydric polyamine having three (3) to five (5) active amine hydrogens and has internal blocks of polyoxyethylene groups. The foam retains from 15 to 35 times its weight in water.

7 Claims, No Drawings

RIGID HYDROPHILIC POLYURETHANE FOAMS

FIELD OF THE INVENTION

The present invention relates to rigid open-celled hydrophilic polyurethane foams and more particularly to such foams prepared by reacting an organic polyisocyanate with a high molecular weight polyoxalklene polyether polyol initiated by a polyhydric polyamine having 3 to 5 active hydrogens and having internal blocks of polyoxethylene groups at an isocyanate index of from 0.35 to 0.70. The hydrophilic foams are suitable for use as floral foams having high water retention.

BACKGROUND OF THE INVENTION

It is well known in the field that hydrophilic polyurethane foams can be prepared for use as soil-free substrates in which plants may take root and grow. Polyurethane foams, however, tend to be hydrophobic by nature, thus limiting the amount of water the sponge will retain. More hydrophilic polyether polyols, such as those oxalkylated with ethylene oxide, when used increase the hydrophilicity of the foam, tend to uncontrollably increase the rate of reaction creating an extremely hot exotherm which burns the foam during its preparation. The problem is exacerbated when a high functional polyol is used to prepare a rigid foam.

SUMMARY OF THE INVENTION

It is an object of the invention to prepare a rigid open-celled polyurethane foam having good water retention. It is also an object of the invention to prepare a foam which reacts well under controlled conditions. These objects are met by reacting a polyether polyol having a molecular weight from about 1,100 to about 10,000 and comprised of a polyhydric polyamine initiator to which are bonded internal blocks of polyoxyethylene groups and terminated with polyoxypropylene groups, with an organic polyisocyanate in the presence of water as a blowing agent to make a rigid, open-celled, hydrophilic polyurethane foam. The polyhydric polyamine initiator is preferably ethylenediamine.

DETAILED DESCRIPTION OF THE INVENTION

The polyurethane foams of the invention are rigid, meaning that they may be characterized as having a high ratio of compressive strength to tensile strength from 0.5:1 or greater, and less than 10 percent elongation. The foams also range in density from about 1.5 pcf to about 3 pcf. The foams of the invention are further characterized as being open celled and retaining from 15-35 times their weight in water.

The polyoxyalkylene polyether polyol composition comprises ethylene oxide and propylene oxide adducts of polyhydric polyamine initiators having three (3) to five (5) active amine hydrogens. The polyamine initiators have two or more amino groups with from a total of 3 to 5 active amine hydrogens on the initiator molecule. Suitable initiators include ethylenediamine, propylenediamine, 1,3-diaminobutane, 1,4-diaminobutane, N-(2-hydroxypropyl)-ethylenediamine, N,N'-di(2-hydroxypropyl)ethylenediamine, N-alkylenephenylenediamine, 2,2'-, 2,4'-, and 2,6'-methylenedianiline, toluenediamine, and diethylenetriamine. Preferred initiators are tetrahydric diamine initiators, more preferably ethylenediamine or propylenediamine, most preferably ethylenediamine.

Methods for the preparation of polyhydric polyamine-initiated polyoxyethylene polyoxypropylene polyether polyols are known to those in the art and are described in U.S. Pat. Nos. 3,036,130 and 3,036,118, each herein incorporated by reference. The polyhydric polyamine-initiated polyether polyol may be prepared by condensing a suitable amount of polyhydric polyamine initiator with a given amount of ethylene oxide to produce a polyoxyethylene polyether polyol and subsequently condensing the polyoxyethylene polyol with propylene oxide.

The polyoxypropylene cap serves to limit the rate of reaction with the isocyanate. The preferred ethylenediamine-initiated polyether polyol used in the invention may be represented by the following general formula:

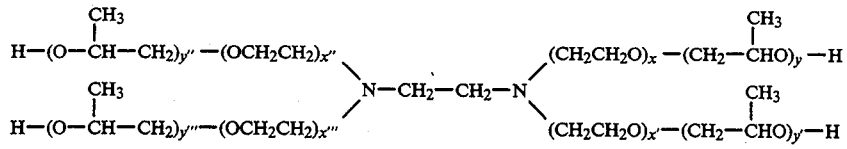
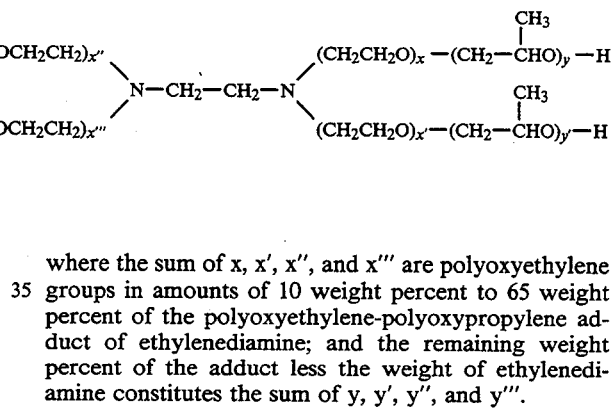

where the sum of x, x', x", and x'" are polyoxyethylene groups in amounts of 10 weight percent to 65 weight percent of the polyoxyethylene-polyoxypropylene adduct of ethylenediamine; and the remaining weight percent of the adduct less the weight of ethylenediamine constitutes the sum of y, y', y", and y'".

Suitable amounts of ethylene oxide are such that the polyhydric polyamine initiated polyether polyols are liquid at room temperature, for example, from 10 weight percent to 65 weight percent, preferably from 30 weight percent to 50 weight percent of the final polyether polyol.

Preferably all amino hydrogens are reacted with ethylene oxide so that the final polyether polyol is structured with polyoxyethylene groups bonded to all former free amino hydrogen sites with no free amino hydrogens remaining. The presence of free amino hydrogens will increase the exotherm temperature since amino hydrogens react with isocyanate quicker than hydroxyl hydrogens. The presence of free amino hydrogens and/or propylene oxide reacted at the active amino hydrogen sites also yields a foam having reduced capacity for water retention. The internal polyoxyethylene block, however, promotes good wet-out of the polyurethane foam, enabling the foam to retain from 15-35 times its weight in water.

The average molecular weight of the polyhydric polyamine initiated polyether polyols is high, from 1,100 to 10,000, more preferably from 3,000 to 5,000. Higher molecular weight polyols have the capacity to contain a greater absolute amount of the hydrophilic polyoxyethylene groups, thus enabling the polyurethane foam to retain a larger amount of water. The hydroxyl numbers of the polyether polyols range from 23 to 200, preferably from 40 to 80. Higher hydroxyl numbers indicate a lower molecular weight polyether polyol, undesirable for purposes of this invention.

Preferably the polyether polyol composition consists of the above-described polyhydric polyamine adduct but may optionally be admixed with other conventional polyoxyalkylene polyether polyols or graft polyols in amounts such that the final foam product retains at least 15 times its weight in water.

Hydroxyl group-containing compounds (polyols) useful in admixture for the preparation of polyurethanes are described in the *Polyurethane Handbook* in Chapter 3, §3.1 pages 42–61; and in *Polyurethanes: Chemistry and Technology* in Chapter II, §,§III and IV, pages 32–47. Extensive lists of suitable polyols may be found in the above references and in many patents, for example, in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Hydroxyl-terminated polyoxyalkylene that may be mixed with the polyhydric polyamine adduct are generally prepared by well-known methods, for example, by the base catalyzed addition of an alkylene oxide, such as propylene oxide (methyloxirane), or butylene oxide (ethyloxirane), preferably ethylene oxide (oxirane) to an initiator molecule containing on the average two or more active hydrogens. Examples of initiator molecules are dihydric initiators such as ethylene glycol, 1,6-hexanediol, hydroquinone, resorcinol, the bisphenols, aniline, and other aromatic monoamines, aliphatic monoamines, and monoesters of glycerine; trihydric initiators such as glycerine, trimethylolpropane, trimethylolethane, N-alkylphenylenediamines, mono-, dio, and trialkanolamines, pentaerythritol, and hexahydric and octahydric initiators such as sorbitol and sucrose.

Addition of alkylene oxide to the initiator molecules may take place simultaneously or sequentially when more than one alkylene oxide is used, resulting in block, heteric, and block-heteric polyoxyalkylene polyethers. Preferable is a polyether oxyalkylated with ethylene oxide. The number of hydroxyl groups will generally equal the number of active hydrogens in the initiator molecule. Processes for preparing such polyethers are described both in the *Polyurethane Handbook* and *Polyurethanes: Chemistry and Technology* as well as in many patents, for example, U.S. Pat. Nos. 1,922,451; 2,674,619; 1,922,459; 3,190,927; and 3,346,557.

Also suitable as a polyol admixed with the polyhydric polyamine initiated adduct are polymer-modified polyols, in particular, the so-called graft polyols. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; al of which patents are herein incorporated by reference.

Non-graft polymer-modified polyols may also be added in mixture, for example, those prepared by the reaction of a polyisocyanate with an alkanolamine in the presence of a polyol as taught by U.S. Pat. Nos 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,54 1. Other polymer-modified polyols may be prepared by the in situ size reduction of polymers until the particle size is less than $20\mu m$, preferably less than $10\mu m$.

Many isocyanates are useful in the preparation of the polyurethane foam of the invention. Examples of such isocyanates may be found in columns 8 and 9 of U.S. Pat. No. 4,690,956, herein incorporated by reference. The isocyanates preferred are the commercial methylenediphenylene-diisocyanate (MDI), and crude or polymeric MDI. Other isocyanates which may be useful include isophoronediisocyanate and tetramethylxylidenediisocyanate. Other isocyanates may be found in the *Polyurethane Handbook*, Chapter 3, §3.2 pages 62–73 and *Polyurethanes: Chemistry and Technology*, Chapter II, §II, pages 17–31.

Modified isocyanates are also useful. Such isocyanates are generally prepared through the reaction of a commercial isocyanates, for example MDI, with a low molecular weight diol or amine, alkanolamine, or by the reaction of the isocyanates with themselves. In the former case, isocyanates containing urethane, biuret, or urea linkages are prepared; while in the latter case, isocyanates containing allophanate, carbodiimide, or isocyanurate linkages are formed.

Chain extenders are useful in the preparation of the polyurethane foam of the invention. Suitable chain extenders are low molecular weight polyfunctional compounds or oligomers reactive with the isocyanate group. Aliphatic glycol chain extenders include ethylene glycol, propylene glycol, 1,4-butanediol, and 1,6-hexanediol. Amine chain extenders include aliphatic monoamines but especially diamines such as ethylenediamine and, in particular, the aromatic diamines such as the toluenediamines and the alkyl-substituted (hindered) toluenediamines.

The blowing agent employed in the hydrophilic polyurethane foam of the invention is water. However, other non- or low-ozone depleting blowing agents may be added to the water such as HCFC-141b, pentane, or formic acid. Corresponding greater amounts of isocyanate must be used to compensate for the isocyanate reacted with water. The amount of blowing agent ranges from 2 weight percent to 10 weight percent based on the weight of all non-isocyanate ingredients. The particular amount depends on the desired density and the desired amount of open cells, preferably from 5 to 10 weight percent.

Polyurethane foams generally require a surfactant to promote uniform cell sizes and prevent foam collapse. Such surfactants are well known to those skilled in the art and are generally polysiloxanes or polyoxyalkylene polysiloxanes. Such surfactants are described, for example, in the *Polyurethane Handbook* on pages 98–101. Commercial surfactants for these purposes are available from a number of sources, for example, from Union Carbide Corporation and Dow-Corning Corporation.

Process for the preparation of polyurethane foams and the equipment used therefor are well known to those in the art and are described, for example, in the *Polyurethane Handbook*, in Chapter 4, pages 117–160 and in *Polyurethanes: Chemistry and Technology*, Part II, Technology, in Chapter VII, §§III and IV on pages 7–116 and Chapter VIII, §§III and IV on pages 201–238.

One may process with the foam manufacture by the prepolymer technique or a one-shot method, applied in batches, continuous or intermittent machine pouring in a mold, or as a slab.

The rigid hydrophilic polyurethane foams of the invention are reacted at a low isocyanate index of from 35-70. The index is defined as the -NCO/active hydrogen ratio multiplied by 100. In calculating the quantity of active hydrogens present, all active hydrogen-containing compounds other than non-dissolving solids are taken into account. Thus, the total is inclusive of polyols, chain extenders, functional plasticizers, etc.

EXAMPLE 1

Into a quart cup was mixed 55 weight percent TETRONIC® 50R4 polyether polyol, an ethylene oxide-propylene oxide adduct of ethylenediamine having a 40 weight percent internal polyoxypropylene block and an average molecular weight of 3,740 commercially available from BASF Corporation; 30 weight percent of an ethylene oxide adduct of ethylene glycol having an OH number of 187; 5 weight percent of ethylene glycol as a chain extender; 8 weight percent water as a blowing agent; and 2 weight percent L5310, a polysiloxane polyalkylene glycol surfactant commercially available from Union Carbide Corporation. The ingredients were thoroughly mixed for 30 seconds using a 3" German blade at 3,000 rpm. To this mixture was added and mixed for 10 seconds LUPRANATE™ M20S isocyanate, a polyphenylpolymethylene polyisocyanate having a free NCO content of about 31.6 weight percent and a functionality of approximately 2.7, commercially available from BASF Corporation, in a weight ratio of isocyanate to resin of 100/100. The mixture was allowed to foam as a free rise. The product was semi-rigid and absorbed water within 15-35 times its own weight.

EXAMPLE 2

To a Lily cup was added and mixed for 30 seconds using a 3" German blade at 3,000 rpm 60 weight percent TETRONIC® 50R4 polyether polyol as described above; 30 weight percent glycerine as a chain extender; 8 weight percent water; and 2 weight percent L5310 as described above. To the Lily cup was added LUPRANATE™ M20S isocyanate at a resin/isocyanate weight ratio of 100/100 and stirred for 10 seconds. The mixture was allowed to foam and free rise, yielding an open-celled rigid foam having a free rise density of 1.58 pcf. The cream time was 38 seconds, gel time 120 seconds, and top of cup time 170 seconds. The foam absorbed 26 times its weight in water.

What I claim is:

1. A hydrophilic, open-celled rigid polyurethane foam having the capacity to absorb from 15 to 35 times its weight in water, comprising the reaction product of:
   A) an organic polyisocyanate;
   B) a compound having at least two isocyanate reactive hydrogens comprising a polyoxypropylene-polyoxyethylene polyether polyol having a number average molecular weight ranging from about 1,100 to about 10,000 and a hydroxyl number of 23 to 200, initiated with a polyhydric polyamine having 3 to 5 active amine hydrogens, wherein the polyoxyethylene groups are situated as an internal block to said polyether polyol;
   C) a chain extender; and
   D) a blowing agent comprising water.

2. The hydrophilic foam of claim 1, wherein said initiator is selected from the group consisting of ethylenediamine and propylenediamine.

3. The hydrophilic foam of claim 2, wherein from 30 weight percent to 50 weight percent of the polyether polyol comprises internal polyoxyethylene groups.

4. The hydrophilic foam of claim 2, wherein said initiator is ethylenediamine.

5. The hydrophilic foam of claim 1, wherein the number average molecular weight is from about 3,000 to about 6,000.

6. The hydrophilic foam of claim 5, wherein the blowing agent consists of water.

7. The hydrophilic foam of claim 5, wherein the ingredients are reacted at an isocyanate index of from 0.35 to 0.70.

* * * * *